US009417476B2

(12) United States Patent
Sato et al.

(10) Patent No.: US 9,417,476 B2
(45) Date of Patent: Aug. 16, 2016

(54) DISPLAY DEVICE (71) Applicant: JAPAN DISPLAY INC., Tokyo (JP)

(72) Inventors: Takao Sato, Funabashi (JP); Saori Sugiyama, Chosei-gun (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/877,731

(22) Filed: Oct. 7, 2015

(65) Prior Publication Data

US 2016/0026036 A1    Jan. 28, 2016

Related U.S. Application Data (63) Continuation of application No. 14/592,496, filed on Jan. 8, 2015, which is a continuation of application No. 14/299,669, filed on Jun. 9, 2014, now Pat. No. 8,958,047, which is a continuation of application No. 13/366,400, filed on Feb. 6, 2012, now Pat. No. 8,760,612.

(30) Foreign Application Priority Data

Feb. 9, 2011   (JP) ................. 2011-025574

(51) Int. Cl.
*G02F 1/1333*   (2006.01)
*G02F 1/1335*   (2006.01)
(Continued)

(52) U.S. Cl.
CPC ........ *G02F 1/133512* (2013.01); *G02F 1/1333* (2013.01); *G02F 1/1339* (2013.01); *G02F 1/133514* (2013.01); *G02F 1/136209* (2013.01); *G02F 1/1368* (2013.01); *G02F 2001/13629* (2013.01); *G02F 2001/133354* (2013.01); *G02F 2001/133374* (2013.01)

(58) Field of Classification Search
CPC .......................... G02F 2001/133354
See application file for complete search history.

(56) References Cited

U.S. PATENT DOCUMENTS

2001/0025958 A1   10/2001   Yamazaki et al.
2005/0073638 A1   4/2005   Byun et al.
(Continued)

FOREIGN PATENT DOCUMENTS

JP   09-230800 A   9/1997
JP   10-104560 A   4/1998
(Continued)

OTHER PUBLICATIONS

Office Action dated on Jan. 14, 2014 regarding U.S. Appl. No. 13/366,400.

*Primary Examiner* — Wen-Ying P Chen
(74) *Attorney, Agent, or Firm* — Typha IP LLC (57) ABSTRACT A display device includes a first substrate which is light transmissive and has a display region and a periphery region surrounding the display region. A light shielding portion is formed in at least the periphery region of the first substrate and has a light passing portion in the periphery region. A first scale mark portion is formed on the first substrate so as to be arranged inside the light passing portion. A second substrate overlaps the first substrate and a second scale mark portion is formed on the second substrate and forms a pair with the first scale mark portion. A sealing member seals the first and second substrates in the periphery region between the display region and the light passing portion. A dam portion is formed on the first substrate between the display region and the light passing portion.

12 Claims, 4 Drawing Sheets (51) Int. Cl.
*G02F 1/1362* (2006.01)
*G02F 1/1339* (2006.01)
*G02F 1/1368* (2006.01)

(56) References Cited

U.S. PATENT DOCUMENTS

| | | |
|---|---|---|
| 2005/0270467 A1 | 12/2005 | Lee |
| 2006/0290874 A1 | 12/2006 | Yoon et al. |
| 2009/0046235 A1 | 2/2009 | Onishi et al. |
| 2009/0059141 A1 | 3/2009 | Nagasawa |
| 2009/0091701 A1 | 4/2009 | Kondo |
| 2011/0181808 A1 | 7/2011 | Kobayashi et al. |

FOREIGN PATENT DOCUMENTS

| | | |
|---|---|---|
| JP | 2001-042527 A | 2/2001 |
| JP | 2002-072222 A | 3/2002 |
| JP | 2004-347659 A | 12/2004 |
| JP | 2007-004111 A | 1/2007 |
| JP | 2009-92752 A | 4/2009 |
| JP | 2009-192667 A | 8/2009 |
| JP | 2010-102134 A | 5/2010 |
| JP | 2011-154155 A | 8/2011 |

DISPLAY DEVICE

CROSS-REFERENCE TO RELATED APPLICATION

This application is a continuation of U.S. patent application Ser. No. 14/592,496, filed on Jul. 7, 2015, which is a continuation of U.S. application Ser. No. 14/299,669, filed on Jun. 9, 2014, now U.S. Pat. No. 8,958,047, which is a continuation of U.S. application Ser. No. 13/366,400, filed on Feb. 6, 2012, now U.S. Pat. No. 8,760,612, the contents of which are incorporated herein by reference.

The present application claims priority from Japanese application JP 2011-025574 filed on Feb. 9, 2011, the content of which is hereby incorporated by reference into this application.

BACKGROUND OF THE INVENTION

1. Field of the Invention

The present invention relates to a display device.

2. Description of the Related Art

A liquid crystal display panel has a structure in which liquid crystal is sandwiched between a pair of substrates. One of the pair of substrates is a thin film transistor (TFT) substrate, and the other thereof is a color filter substrate. On the TFT substrate, a large number of pixel electrodes are formed, whereas, a large number of colored layers are formed on the color filter substrate. It is necessary to arrange the TFT substrate and the color filter substrate so that the pixel electrodes and the colored layers are aligned with each other. Conventionally, the liquid crystal display panel has been provided with scale marks for measuring a misalignment amount (dimension) between the TFT substrate and the color filter substrate (Japanese Patent Application Laid-open No. Hei 10-104560 and Japanese Patent Application Laid-open No. 2010-102134).

Because of the formation of the scale marks, light leakage of the liquid crystal display panel has become a problem. As a countermeasure against the light leakage, there can be conceived a method of blocking off an opening through which light leaks by utilizing a metal film to be used when forming the TFT substrate. However, in this case, the metal film and the scale marks overlap one on top of another, which makes it difficult to read the scale marks. Besides, the pair of substrates are adhered to each other by a sealing member, and the liquid crystal is sealed in a space surrounded by the sealing member. Even when the sealing member overlaps the scale marks, it becomes difficult to read the scale marks. The sealing member is more liable to overlap the scale marks as the size of the region for the scale marks increases.

SUMMARY OF THE INVENTION

The present invention has an object to provide a display device capable of preventing reduction in visibility of scale marks.

(1) A display device according to an embodiment of the present invention includes: a first light transmissive substrate including: a display region in which an image is to be displayed in accordance with passing and blocking of light and intensity of the light; and a periphery region surrounding the display region; a light shielding portion formed in at least the periphery region of the first light transmissive substrate, the light shielding portion having an opening portion in the periphery region; a first scale mark portion formed on the first light transmissive substrate so as to be arranged inside the opening portion; a second light transmissive substrate arranged so as to overlap the first light transmissive substrate; a thin film transistor, which is formed on the second light transmissive substrate, for controlling the passing and blocking of the light and the intensity of the light; and a second scale mark portion, which is formed on the second light transmissive substrate and forms a pair with the first scale mark portion, in which: the second light transmissive substrate includes a first metal layer, a semiconductor layer, and a second metal layer which are laminated one on top of another; the thin film transistor is formed so as to include a part of the first metal layer, a part of the semiconductor layer, and a part of the second metal layer; the second scale mark portion is formed of another part of the second metal layer; under the second scale mark portion, another part of the semiconductor layer is formed so as to extend off from the second scale mark portion; and below the second scale mark portion and the semiconductor layer, another part of the first metal layer is formed in a size capable of shielding the opening portion. According to the present invention, the first metal layer shields the opening portion, and hence it is possible to prevent light leakage from the opening portion. Further, the part of the semiconductor layer is positioned so as to extend off from the second scale mark portion, which is formed of the part of the second metal layer, from below. Through absorption of light by the semiconductor layer, the second scale mark portion may be emphasized to enhance the visibility.

(2) In the display device described in the above-mentioned item (1), the semiconductor layer may be made of amorphous silicon being a base material.

(3) A display device according to another embodiment of the present invention includes: a first light transmissive substrate including: a display region in which an image is to be displayed in accordance with passing and blocking of light and intensity of the light; and a periphery region surrounding the display region; a light shielding portion formed in at least the periphery region of the first light transmissive substrate, the light shielding portion having an opening portion in the periphery region; a first scale mark portion formed on the first light transmissive substrate so as to be arranged inside the opening portion; a second light transmissive substrate arranged so as to overlap the first light transmissive substrate; a thin film transistor, which is formed on the second light transmissive substrate, for controlling the passing and blocking of the light and the intensity of the light; and a second scale mark portion, which is formed on the second light transmissive substrate and forms a pair with the first scale mark portion, in which: the second light transmissive substrate includes a first metal layer, a colored layer, and a second metal layer which are laminated one on top of another; the thin film transistor is formed so as to include a part of the first metal layer, a part of the colored layer, and a part of the second metal layer; the second scale mark portion is formed of another part of the second metal layer; under the second scale mark portion, another part of the colored layer is formed so as to extend off from the second scale mark portion; and below the second scale mark portion and the colored layer, another part of the first metal layer is formed in a size capable of shielding the opening portion. According to the present invention, the first metal layer shields the opening portion, and hence it is possible to prevent light leakage from the opening portion. Further, the part of the colored layer is positioned so as to extend off from the second scale mark portion, which is formed of the part of the second metal layer, from below. Through absorption of light by the colored layer, the second scale mark portion may be emphasized to enhance the visibility.

(4) In the display device described in any one of the above-mentioned items (1) to (3), one of the first scale mark portion and the second scale mark portion may be set as a main scale mark, and another of the first scale mark portion and the second scale mark portion may be set as a vernier scale mark, to thereby enable measurement in a smaller dimension than the main scale mark.

(5) In the display device described in the above-mentioned item (4), each of the main scale mark and the vernier scale mark may include scale mark lines which are aligned in mutually opposite directions from a reference scale mark line, to thereby enable measurement in a positive direction and in a negative direction along the scale mark lines.

(6) In the display device described in the above-mentioned item (4), the main scale mark may include a first main scale mark and a second main scale mark extending in parallel to each other, the vernier scale mark may include a first vernier scale mark and a second vernier scale mark extending in parallel to each other, the first main scale mark and the first vernier scale mark may form a pair, the second main scale mark and the second vernier scale mark may form a pair, the opening portion may include a first opening portion and a second opening portion positioned respectively on two sides sandwiching the display region, each of the first main scale mark and the first vernier scale mark may be arranged so that, within the first opening portion, scale mark lines are aligned only in a first direction from a reference scale mark line, and each of the second main scale mark and the second vernier scale mark may be arranged so that, within the second opening portion, scale mark lines are aligned only in a second direction, which is opposite to the first direction, from a reference scale mark line.

(7) The display device described in any one of the above-mentioned items (1) to (6) may further include: liquid crystal; a sealing member for sealing the liquid crystal between the first light transmissive substrate and the second light transmissive substrate; and a dam portion formed on the first light transmissive substrate. The sealing member may be arranged in the periphery region of the first light transmissive substrate on the display region side with respect to the opening portion of the light shielding portion, and the dam portion may be arranged between the sealing member and the opening portion so as to separate the opening portion from the sealing member.

(8) In the display device described in the above-mentioned item (7), the dam portion may be arranged in contact with the sealing member.

(9) A display device according to still another embodiment of the present invention includes: a first light transmissive substrate including: a display region in which an image is to be displayed in accordance with passing and blocking of light and intensity of the light; and a periphery region surrounding the display region; a light shielding portion formed in at least the periphery region of the first light transmissive substrate, the light shielding portion having an opening portion in the periphery region; a first scale mark portion formed on the first light transmissive substrate so as to be arranged inside the opening portion; a second light transmissive substrate arranged so as to overlap the first light transmissive substrate; a second scale mark portion, which is formed on the second light transmissive substrate and forms a pair with the first scale mark portion; liquid crystal; a sealing member for sealing the liquid crystal between the first light transmissive substrate and the second light transmissive substrate; and a dam portion formed on the first light transmissive substrate, in which: the sealing member is arranged in the periphery region of the first light transmissive substrate on the display region side with respect to the opening portion of the light shielding portion; and the dam portion is arranged between the sealing member and the opening portion so as to separate the opening portion from the sealing member. According to the present invention, with the dam portion, it is possible to prevent the opening portion from being covered with the sealing member. In this manner, it is possible to prevent reduction in visibility of the first scale mark portion and the second scale mark portion.

(10) A display device according to yet another embodiment of the present invention includes: a first light transmissive substrate including: a display region in which an image is to be displayed in accordance with passing and blocking of light and intensity of the light; and a periphery region surrounding the display region; a light shielding portion formed in at least the periphery region of the first light transmissive substrate, the light shielding portion including a first opening portion and a second opening portion positioned respectively on two sides of the periphery region, which sandwich the display region; a first scale mark portion formed on the first light transmissive substrate so as to be arranged inside the first opening portion; a second scale mark portion formed on the first light transmissive substrate so as to be arranged inside the second opening portion; a second light transmissive substrate arranged so as to overlap the first light transmissive substrate; a third scale mark portion, which is formed on the second light transmissive substrate and forms a pair with the first scale mark portion; and a fourth scale mark portion, which is formed on the second light transmissive substrate and forms a pair with the second scale mark portion, in which: one of the first scale mark portion and the third scale mark portion is set as a first main scale mark, and another of the first scale mark portion and the third scale mark portion is set as a first vernier scale mark, to thereby enable measurement in a smaller dimension than the first main scale mark; one of the second scale mark portion and the fourth scale mark portion is set as a second main scale mark, and another of the second scale mark portion and the fourth scale mark portion is set as a second vernier scale mark, to thereby enable measurement in a smaller dimension than the second main scale mark; the first main scale mark and the second main scale mark extend in parallel to each other; the first vernier scale mark and the second vernier scale mark extend in parallel to each other; each of the first main scale mark and the first vernier scale mark is arranged so that, within the first opening portion, scale mark lines are aligned only in a first direction from a reference scale mark line; and each of the second main scale mark and the second vernier scale mark is arranged so that, within the second opening portion, scale mark lines are aligned only in a second direction, which is opposite to the first direction, from a reference scale mark line. According to the present invention, the scale mark extends only in one direction, and hence, within the opening portion, an area occupied by the scale mark is reduced. Therefore, the visibility is enhanced.

DETAILED DESCRIPTION OF THE INVENTION

Hereinafter, an embodiment of the present invention is described with reference to the drawings.

Figure 1:
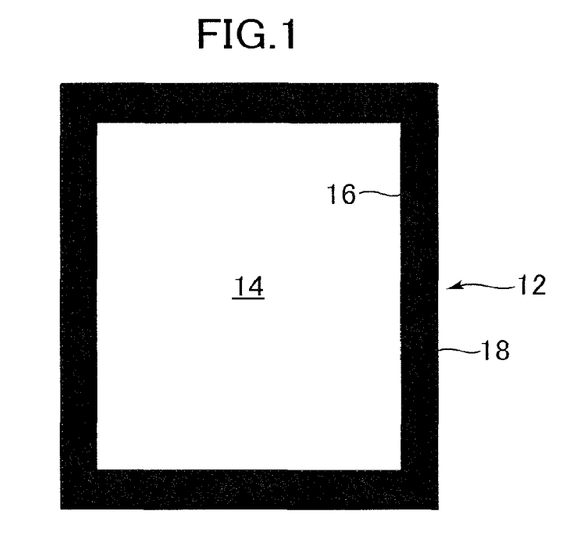
FIG. 1 is a plan view illustrating a display device according to an embodiment of the present invention.
Figure 2:
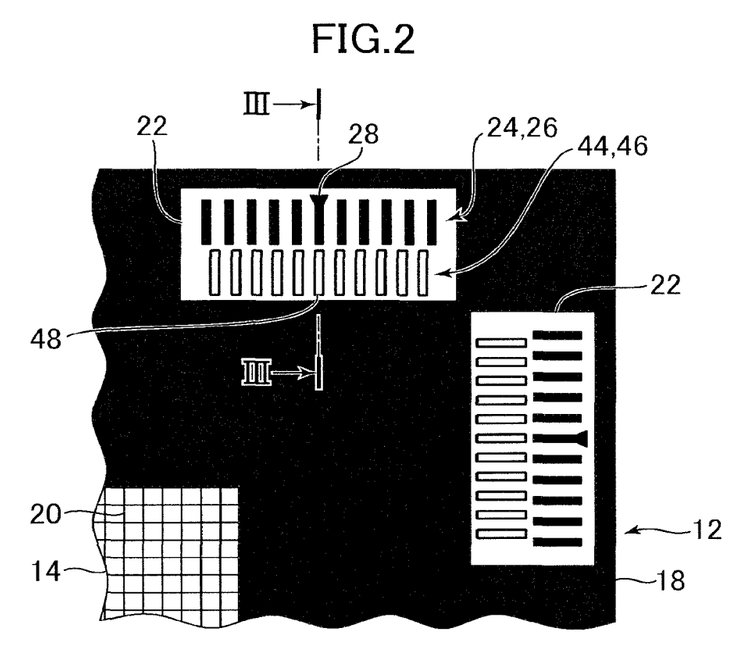
FIG. 2 is an enlarged view of a corner portion of the display device illustrated in FIG. 1.
Figure 3:
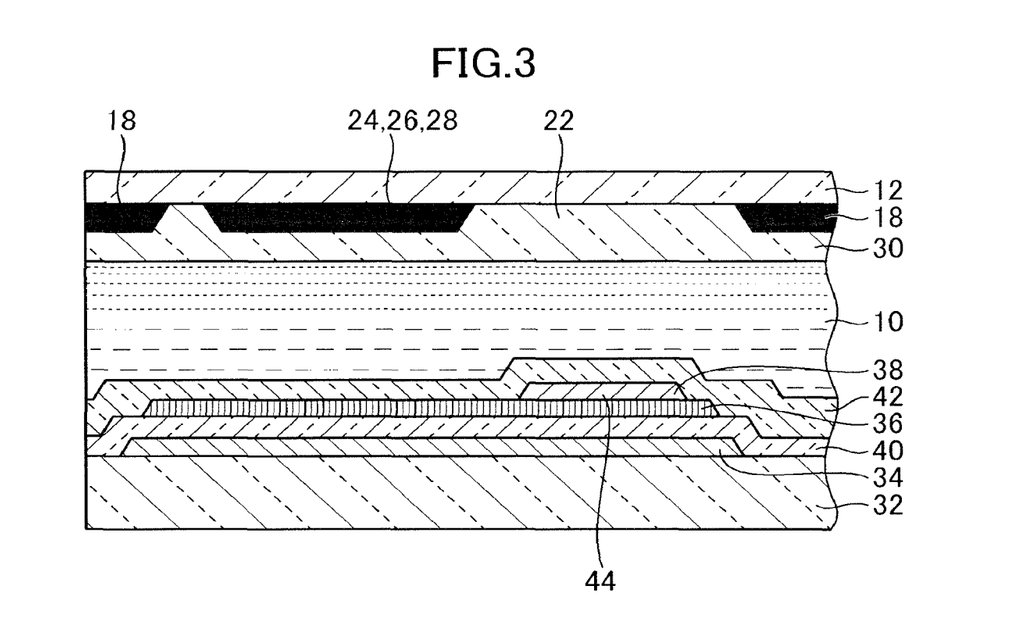
FIG. 3 is a sectional view taken along the line of the display device illustrated in FIG. 2.

FIG. 1 is a plan view illustrating a display device according to the embodiment of the present invention. FIG. 2 is an enlarged view of a corner portion of the display device illustrated in FIG. 1. FIG. 3 is a sectional view taken along the line of the display device illustrated in FIG. 2.

The display device according to this embodiment is a liquid crystal display device, and hence includes liquid crystal 10 illustrated in FIG. 3. By controlling the direction of molecules of the liquid crystal 10, passing and blocking of light and intensity of the light may be controlled.

The display device includes a first light transmissive substrate 12 (for example, glass substrate). The first light transmissive substrate 12 includes, as illustrated in FIG. 1, a display region 14 in which an image is to be displayed. The image is formed of a plurality of (large number of) pixels (not shown), and is displayed in accordance with the passing and blocking of the light and the intensity of the light controlled in each pixel. That is, by controlling the liquid crystal 10, the image formed by the light is displayed. A periphery region 16 is provided so as to surround the display region 14.

In at least the periphery region 16 of the first light transmissive substrate 12, a light shielding portion 18 is formed. The light shielding portion 18 blocks light passage. In this manner, the periphery region 16 surrounding the display region 14 is darkened, to thereby make the image more visible. The light shielding portion 18 includes, as illustrated in FIG. 2, a black matrix 20 arranged in the display region 14. The light shielding portion 18 has opening portions 22 in the periphery region 16. Light passes through the opening portions 22. Further, a first scale mark portion 24 is formed on the first light transmissive substrate 12 so as to be arranged inside each opening portion 22. The first scale mark portion 24 blocks light passage. A plurality of scale mark lines 26 are aligned to form the first scale mark portion 24. As illustrated in FIG. 2, one of the plurality of scale mark lines 26 corresponds to a reference scale mark line 28. A line positioned at the center of the plurality of scale mark lines 26 of the first scale mark portion 24 corresponds to the reference scale mark line 28. The scale mark lines 26 are aligned in mutually opposite directions from the reference scale mark line 28 so that measurement in a positive direction and in a negative direction can be performed along the scale mark lines. The light shielding portion 18 and the first scale mark portion 24 are made of the same material.

As illustrated in FIG. 3, the first light transmissive substrate 12 includes a color filter layer 30. The color filter layer 30 is formed so as to cover the light shielding portion 18. The color filter layer 30 also covers the opening portion 22, and further covers the first scale mark portion 24.

The display device includes a second light transmissive substrate 32 (for example, glass substrate) which is arranged so as to overlap the first light transmissive substrate 12. The liquid crystal 10 is sandwiched between the first light transmissive substrate 12 and the second light transmissive substrate 32. Note that, illustration of alignment films is omitted.

On the second light transmissive substrate 32, a first metal layer 34, a semiconductor layer 36, and a second metal layer 38 are laminated in the stated order from the lower side (second light transmissive substrate 32 side). "Laminate" means that layers are partially overlapped one on top of another. Therefore, there may be overlapping portions and non-overlapping portions in the layers, and another layer may be interposed between the layers. In the example illustrated in FIG. 3, an insulating layer 40 is interposed between the first metal layer 34 and the semiconductor layer 36. Further, a passivation film 42 is formed on the second metal layer 38. The passivation film 42 covers the semiconductor layer 36 and also the second metal layer 38, and further covers the insulating layer 40.

The first metal layer 34 and the second metal layer 38 are each made of a metal such as aluminum, molybdenum, and chromium. The first metal layer 34 and the second metal layer 38 are often made of the same material, and in this case, a light reflectance ratio is the same. Therefore, the first metal layer 34 and the second metal layer 38, which partially overlap one on top of another so that ends thereof are offset from each other, are visually indistinguishable when viewed from the surface side.

The semiconductor layer 36 is made of amorphous silicon being a base material. The amorphous silicon has a red color, and hence the semiconductor layer 36 may be used as the colored layer. The semiconductor layer 36 (colored layer) and the second metal layer 38 have different light reflectance ratios or different colors, and hence the second metal layer 38 and the semiconductor layer 36, which partially overlap one on top of another so that ends thereof are offset from each other, are easily distinguishable when viewed from the surface side.

As illustrated in FIG. 3, on the second light transmissive substrate 32, a second scale mark portion 44 which forms a pair with the first scale mark portion 24 is formed. As illustrated in FIG. 2, a plurality of scale mark lines 46 are aligned to form the second scale mark portion 44. One of the plurality of scale mark lines 46 corresponds to a reference scale mark line 48. A line positioned at the center of the plurality of scale mark lines 46 of the second scale mark portion 44 corresponds to the reference scale mark line 48. The scale mark lines 46 are aligned in mutually opposite directions from the reference scale mark line 48 so that measurement in a positive direction and in a negative direction can be performed along the scale mark lines.

In this embodiment, the first scale mark portion 24 is a main scale mark, and the second scale mark portion 44 is a vernier scale mark. Intervals between the scale mark lines 46 of the second scale mark portion 44 is smaller than intervals between the scale mark lines 26 of the first scale mark portion 24. By reading the scale mark line 46 of the second scale mark portion 44, which coincides with the first scale mark portion 24, it is possible to measure a smaller dimension than the first scale mark portion 24 which is the main scale mark. Note that, as a modified example, the second scale mark portion 44 may be the main scale mark, and the first scale mark portion 24 may be the vernier scale mark.

The second scale mark portion 44 is formed of a part of the second metal layer 38. Under the second scale mark portion 44, a part of the semiconductor layer 36 (colored layer) is formed so as to extend off from the second scale mark portion 44. The semiconductor layer 36 (colored layer) extends off from the second scale mark portion 44 so as to surround the entire outer periphery of the second scale mark portion 44. Therefore, through absorption of light by the semiconductor layer 36 (colored layer), the second scale mark portion 44 may be emphasized to enhance the visibility.

Below the second scale mark portion 44 and the semiconductor layer 36, a part of the first metal layer 34 is formed in a size capable of shielding the opening portion 22. The first metal layer 34 shields the opening portion 22, and hence it is possible to prevent the light leakage from the opening portion 22 of the light shielding portion 18.

Figure 4:
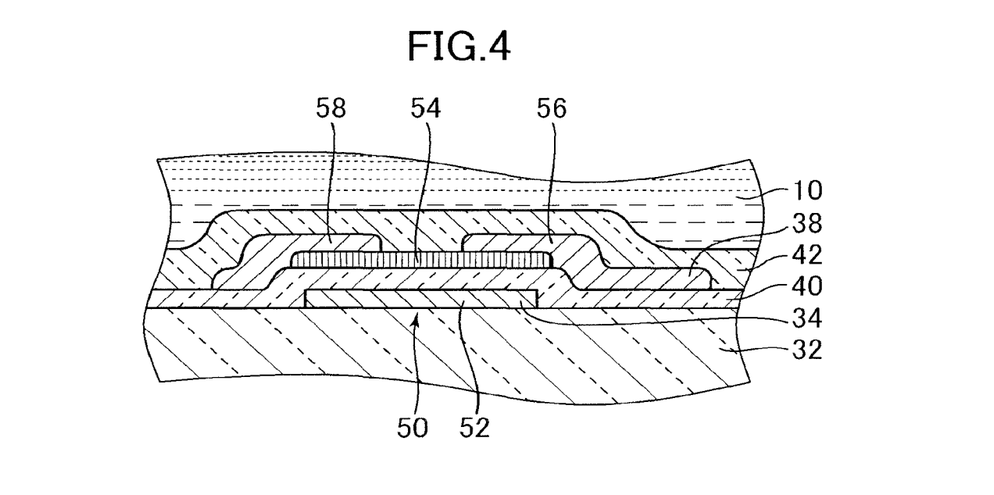
FIG. 4 is a sectional view of the display device at a position different from that of FIG. 3.

FIG. 4 is a sectional view of the display device at a position different from that of FIG. 3. On the second light transmissive substrate 32, there is formed a thin film transistor 50 for controlling passing and blocking of light and intensity of the light. The thin film transistor 50 is formed so as to include a part of the first metal layer 34 (for example, gate electrode 52), a part of the semiconductor layer 36 (for example, channel region 54), and a part of the second metal layer 38 (for example, drain electrode 56 and source electrode 58). The insulating layer 40 (gate insulating film) is interposed between the first metal layer 34 forming the gate electrode 52 and the semiconductor layer 36 forming the channel region 54.

In this embodiment, the first metal layer 34 includes a portion shielding the opening portion 22 and a portion forming a part of the thin film transistor 50 (for example, the gate electrode 52). The second metal layer 38 includes a portion forming the second scale mark portion 44 and a portion forming a part of the thin film transistor 50 (for example, the drain electrode 56 and the source electrode 58). The semiconductor layer 36 (colored layer) includes a portion which extends off from the second scale mark portion 44 from below, and a portion forming a part of the thin film transistor 50 (for example, the channel region 54). Therefore, the second scale mark portion 44 and the thin film transistor 50 can be formed of the same first metal layer 34, second metal layer 38, and semiconductor layer 36, and hence the number of the manufacturing steps does not increase.

Figure 5:
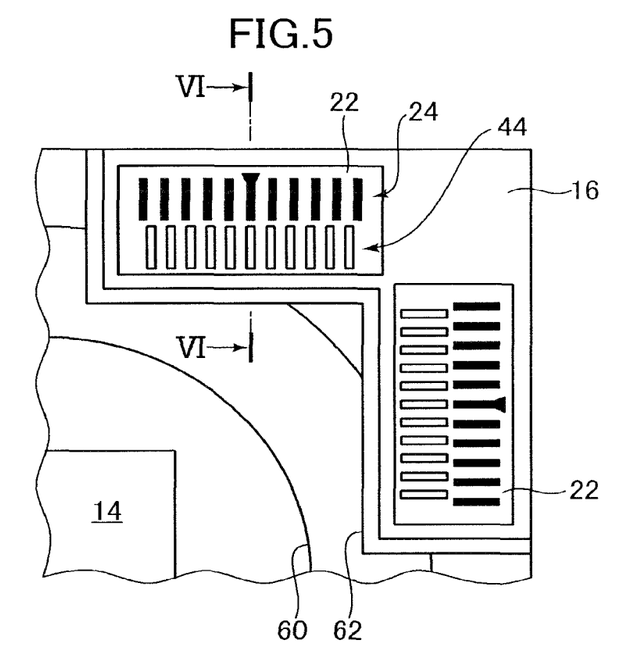
FIG. 5 is a view illustrating a first modified example of the display device according to the embodiment.
Figure 6:
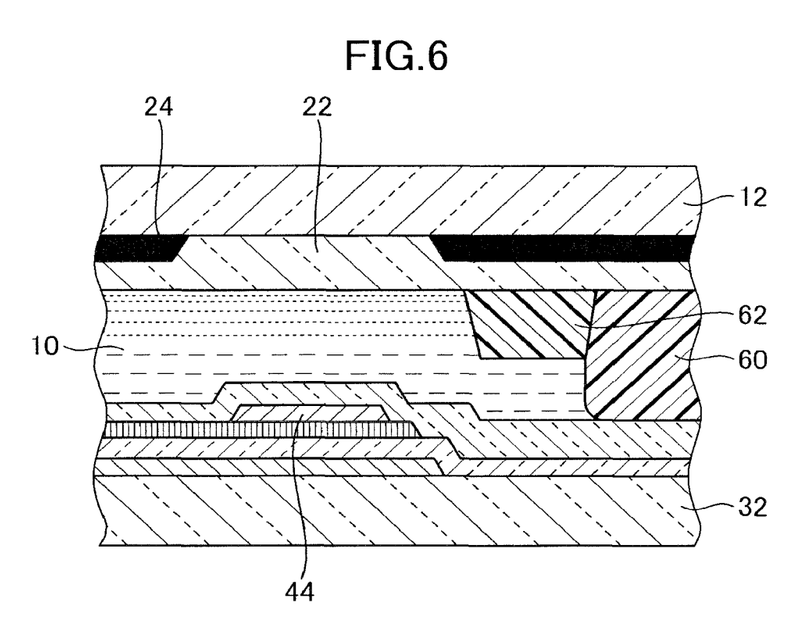
FIG. 6 is a sectional view taken along the line VI-VI of the display device illustrated in FIG. 5.

FIG. 5 is a view illustrating a first modified example of the display device according to this embodiment. FIG. 6 is a sectional view taken along the line VI-VI of the display device illustrated in FIG. 5. In this example, the liquid crystal 10 is sealed between the first light transmissive substrate 12 and the second light transmissive substrate 32 by a sealing member 60.

The sealing member 60 is arranged in the periphery region 16 of the first light transmissive substrate 12 on the display region 14 side with respect to the opening portion 22 of the light shielding portion 18. The sealing member 60 is provided in close contact with mutually facing surfaces of the first light transmissive substrate 12 and the second light transmissive substrate 32.

On the first light transmissive substrate 12, a dam portion 62 is formed. The dam portion 62 is arranged between the opening portion 22 and the display region 14. For example, the dam portion 62 is positioned adjacent to the opening portion 22 on the display region 14 side. Further, the dam portion 62 is arranged between the sealing member 60 and the opening portion 22 so as to separate the opening portion 22 from the sealing member 60.

Specifically, the sealing member 60 is formed by arranging and curing a resin precursor between the first light transmissive substrate 12 and the second light transmissive substrate 32. In this process, the resin precursor becomes a liquid or paste, and hence when the first light transmissive substrate 12 and the second light transmissive substrate 32 are pressed so as to narrow a gap therebetween, the resin precursor attempts to expand in a direction toward the opening portion 22. In this context, the dam portion 62 plays a role to stop the resin precursor right before the opening portion 22. With the dam portion 62, it is possible to prevent the opening portion 22 from being covered with the sealing member 60. In this manner, it is possible to prevent reduction in visibility of the first scale mark portion 24 and the second scale mark portion 44.

The dam portion 62 is arranged in contact with the sealing member 60. Further, the dam portion 62 is arranged in contact (close contact) with the first light transmissive substrate 12. In the example of FIG. 6, the dam portion 62 is not provided in contact with the second light transmissive substrate 32, and there is a gap therebetween. Even in this case, because the dam portion 62 is provided, flow resistance of the resin precursor can be enhanced, and hence it is possible to impede the progress of the resin precursor. As a modified example, the dam portion 62 may be arranged in contact (close contact) with the first light transmissive substrate 12 and the second light transmissive substrate 32. For example, the dam portion 62 may be formed on the first light transmissive substrate 12 in advance, and when the first light transmissive substrate 12 is adhered to the second light transmissive substrate 32, the dam portion 62 may be pressed against the second light transmissive substrate 32.

Figure 7:
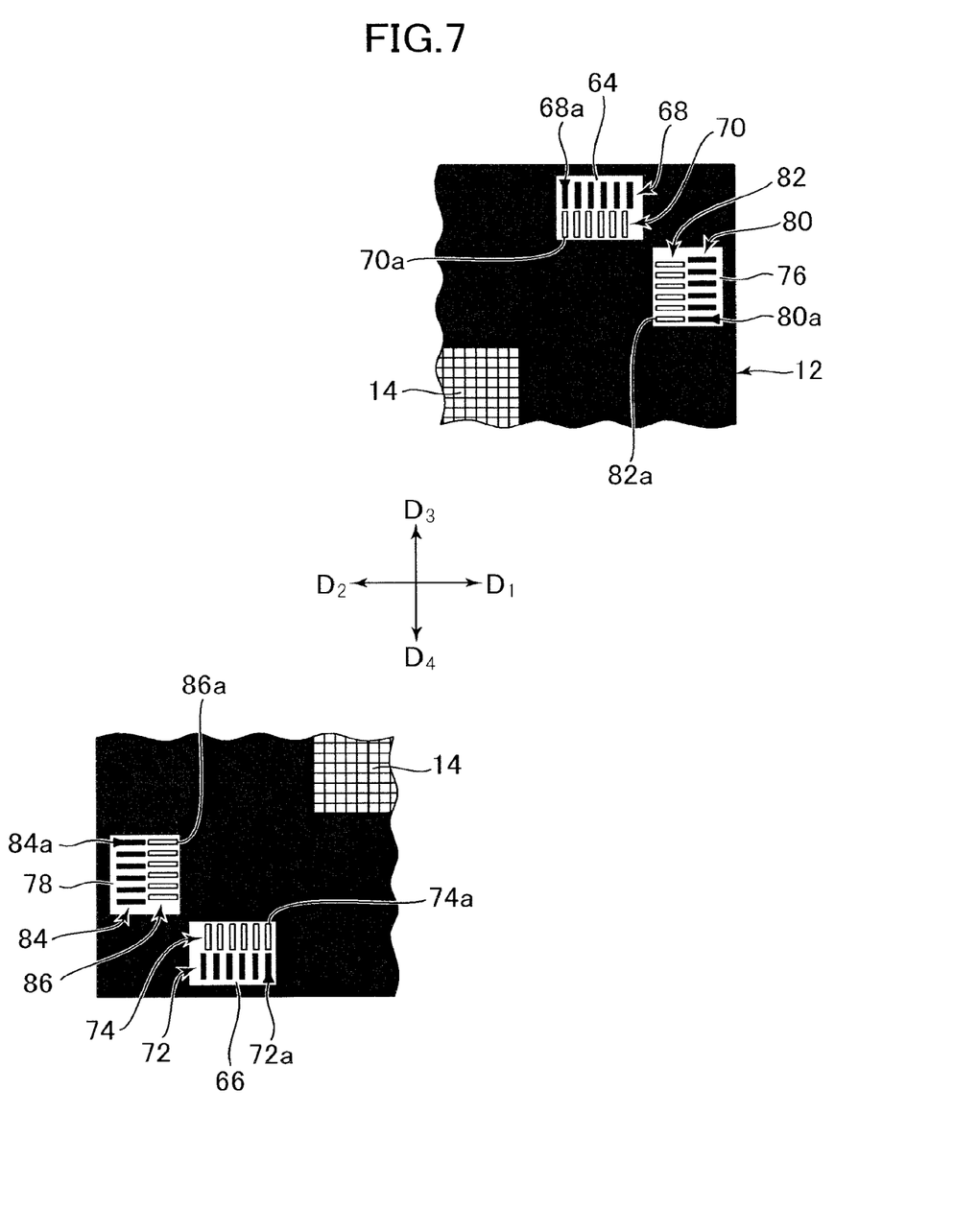
FIG. 7 is a plan view illustrating a second modified example of the display device according to the embodiment.

FIG. 7 is a plan view illustrating a second modified example of the display device according to this embodiment. FIG. 7 illustrates only a pair of corner portions positioned on both sides of a diagonal line of the display device having a rectangular and planar shape.

In this example, the opening portion includes a first opening portion 64 and a second opening portion 66 respectively positioned on two sides sandwiching the display region 14. The first opening portion 64 and the second opening portion 66 are symmetrical with respect to a point. The point as a reference for the point symmetry may be a center portion (intersection point of diagonal lines) of the display region 14 when the display region 14 has a rectangular shape, or may be a center portion (intersection point of diagonal lines) of the first light transmissive substrate 12 when the first light transmissive substrate 12 has a rectangular shape.

Inside the first opening portion 64, a first main scale mark 68 and a first vernier scale mark 70 are arranged to form a pair. The first main scale mark 68 and the first vernier scale mark 70 are respectively arranged so that scale mark lines are aligned only in a first direction $D_1$ from reference scale mark lines 68a and 70a.

Inside the second opening portion 66, a second main scale mark 72 and a second vernier scale mark 74 are arranged to form a pair. The second main scale mark 72 and the second vernier scale mark 74 are respectively arranged so that scale mark lines are aligned only in a second direction $D_2$, which is opposite to the first direction $D_1$, from reference scale mark lines 72a and 74a. Note that, the first main scale mark 68 and the second main scale mark 72 extend in parallel to each other, and the first vernier scale mark 70 and the second vernier scale mark 74 extend in parallel to each other.

The first main scale mark 68 and the first vernier scale mark 70 enable measurement in the first direction $D_1$, and the second main scale mark 72 and the second vernier scale mark 74 enable measurement in the second direction $D_2$. As described above, the scale marks extend only in one direction, and hence, within the first opening portion 64 or the second opening portion 66, an area occupied by the scale mark is reduced. Therefore, the sealing member 60 (see FIG. 6) does not cover over the scale mark, and the visibility of the scale mark is enhanced.

Further, in the example of FIG. 7, the opening portion further includes a third opening portion 76 and a fourth opening portion 78 respectively positioned on two sides sandwiching the display region 14. The third opening portion 76 and the fourth opening portion 78 are symmetrical with respect to a point. The point as a reference for the point symmetry may be a center portion (intersection point of diagonal lines) of the display region 14 when the display region 14 has a rectangular shape, or may be a center portion (intersection point of diagonal lines) of the first light transmissive substrate 12 when the first light transmissive substrate 12 has a rectangular shape.

Inside the third opening portion 76, a third main scale mark 80 and a third vernier scale mark 82 are arranged to form a pair. The third main scale mark 80 and the third vernier scale mark 82 are respectively arranged so that scale mark lines are aligned only in a third direction $D_3$, which is orthogonal to the first direction $D_1$, from reference scale mark lines 80a and 82a.

Inside the fourth opening portion 78, a fourth main scale mark 84 and a fourth vernier scale mark 86 are arranged to form a pair. The fourth main scale mark 84 and the fourth vernier scale mark 86 are respectively arranged so that scale mark lines are aligned only in a fourth direction $D_4$, which is opposite to the third direction $D_3$, from reference scale mark lines 84a and 86a. Note that, the third main scale mark 80 and the fourth main scale mark 84 extend in parallel to each other, and the third vernier scale mark 82 and the fourth vernier scale mark 86 extend in parallel to each other.

The third main scale mark 80 and the third vernier scale mark 82 enable measurement in the third direction $D_3$, and the fourth main scale mark 84 and the fourth vernier scale mark 86 enable measurement in the fourth direction $D_4$.

Therefore, in addition to the measurement in the first direction $D_1$ and the measurement in the second direction $D_2$ as described above, the measurement in the third direction $D_3$ and the measurement in the fourth direction $D_4$ can be performed. Therefore, similarly to the above-mentioned embodiment, measurement in the positive direction and in the negative direction can be performed.

The present invention is not limited to the above-mentioned embodiment, and various modifications may be made thereto. For example, the structure described in the embodiment may be replaced by substantially the same structure, a structure which has the same action and effect, or a structure which can achieve the same object.

The invention claimed is:

1. A display device, comprising:
   a first substrate including a display region and a periphery region surrounding the display region;
   a first scale mark portion in the periphery region, the first scale mark portion including first scale marks each of which is made of material of a black matrix;
   a second substrate arranged so as to overlap with the first substrate;
   a second scale mark portion to be paired with the first scale mark portion in the periphery region, the second scale mark portion including second scale marks each of which is made of metal, each of the second scale marks having a rectangular shape with a long axis and a short axis;
   a colored layer, which is a semiconductor layer, on the second substrate in the periphery region, the colored layer being longer than each of the second scale marks along at least one of the long axis and the short axis; and
   a sealing member for sealing the first and the second substrate.

2. The display device according to claim 1, wherein the colored layer is longer than each of the second scale marks along both the long axis and the short axis.

3. The display device according to claim 1, wherein the colored layer is longer than each of the second scale marks along the long axis.

4. The display device according to claim 1, wherein the colored layer is longer than each of the second scale marks along the short axis.

5. The display device according to claim 1, wherein the colored layer is opposed to each of the first scale marks and each of the second scale marks.

6. The display device according to claim 1, wherein
   the first scale marks have a first interval next to each other,
   the second scale marks have a second interval next to each other, and
   the first interval is greater than the second interval.

7. The display device according to claim 1,
   further comprising a light shielding portion and a light passing portion in the periphery region of the first substrate,
   wherein the second scale mark portion and the colored layer are located in an area on the second substrate opposed to the light passing portion.

8. The display device according to claim 7, wherein
   the display device has a corner portion, and
   the light passing portion is located at the corner portion.

9. The display device according to claim 7,
   wherein the display device has a rectangular shape in plan view, the rectangular shape having a pair of corner portions at both ends of a diagonal line of the rectangular shape,
   wherein the light passing portion includes a plurality of openings at each of the pair of corner portions.

10. The display device according to claim 7, further comprising a color filter layer on the first substrate, the color filter covering the light passing portion.

11. The display device according to claim 7,
    further comprising a metal layer on the second substrate below the colored layer,
    wherein the metal layer has a size large enough to wholly cover the colored layer, viewed from the second substrate.

12. The display device according to claim 11, wherein the metal layer is large enough to wholly cover the light passing portion.

* * * * *